(12) United States Patent  (10) Patent No.: US 8,801,458 B2
Ceraldi et al.  (45) Date of Patent: Aug. 12, 2014

(54) ELECTRICAL CORD REEL WITH REMOVEABLE CORD

(71) Applicant: Great Stuff, Inc., Austin, TX (US)

(72) Inventors: Richard Ceraldi, Austin, TX (US); James B. A. Tracey, Austin, TX (US)

(73) Assignee: Great Stuff, Inc., Austin, TX (US)

( * ) Notice: Subject to any disclaimer, the term of this patent is extended or adjusted under 35 U.S.C. 154(b) by 42 days.

(21) Appl. No.: 13/724,476

(22) Filed: Dec. 21, 2012

(65) Prior Publication Data

US 2013/0171865 A1   Jul. 4, 2013

Related U.S. Application Data

(60) Provisional application No. 61/582,768, filed on Jan. 3, 2012, provisional application No. 61/609,178, filed on Mar. 9, 2012.

(51) Int. Cl.
*H01R 13/72* (2006.01)

(52) U.S. Cl.
USPC .......................................... 439/501; 439/954

(58) Field of Classification Search
USPC ............. 439/534, 536, 535, 131, 142, 165, 6, 439/651, 501, 954
See application file for complete search history.

(56) References Cited

U.S. PATENT DOCUMENTS

| 4,052,751 | A | 10/1977 | Shepard |
| 4,058,735 | A | 11/1977 | Tippner |
| 4,131,805 | A | 12/1978 | Austin et al. |
| 4,153,923 | A | 5/1979 | Graf |
| 4,384,688 | A | 5/1983 | Smith |
| 4,403,143 | A | 9/1983 | Walker et al. |
| 4,713,497 | A | 12/1987 | Smith |
| 5,428,471 | A | 6/1995 | McDermott |
| 5,600,306 | A | 2/1997 | Ichikawa et al. |
| 5,781,015 | A | 7/1998 | Duffin et al. |
| 6,068,490 | A * | 5/2000 | Salzberg ........................ 439/25 |

(Continued)

FOREIGN PATENT DOCUMENTS

WO    WO 2013/022791    2/2013

OTHER PUBLICATIONS

International Search Report and Written Opinion for application No. PCT/US2012/049628, mailed on Oct. 26, 2012, by Blaine R. Copenheaver.

(Continued)

*Primary Examiner* — Neil Abrams
*Assistant Examiner* — Phuongchi T Nguyen
(74) *Attorney, Agent, or Firm* — Knobbe, Martens, Olson & Bear, LLP

(57) ABSTRACT

An electrical cord can include a cord segment with an electrical connector. The connector can connect to a spool member of an electrical cord reel to form an electrical connection between the electrical cord and the electrical cord reel. The spool can have a recess that engages and/or mates with the connector. When the connector is in the recess, at least a portion of the connector can be flush with a cylinder surface of the spool. The connector can be secured in the recess with one or more fasteners (e.g., screws). The connector and recess can have members that act as the primary load bearing members when spooling and unspooling the electrical cord to inhibit the application of loads on the electrical connection during rotation of the spool member.

24 Claims, 11 Drawing Sheets

(56) References Cited

U.S. PATENT DOCUMENTS

| | | | |
|---|---|---|---|
| 6,165,010 A * | 12/2000 | Prazoff | 439/534 |
| 6,191,697 B1 | 2/2001 | Hansen et al. | |
| 6,230,109 B1 | 5/2001 | Miskimins et al. | |
| 6,276,502 B1 | 8/2001 | Leyba et al. | |
| 6,323,652 B1 | 11/2001 | Collier et al. | |
| 6,437,957 B1 | 8/2002 | Karuppana et al. | |
| 6,854,989 B2 * | 2/2005 | Milan | 439/131 |
| 7,136,266 B2 | 11/2006 | Gershen et al. | |
| 7,320,843 B2 | 1/2008 | Harrington | |
| 7,350,736 B2 | 4/2008 | Caamano et al. | |
| 7,419,038 B2 | 9/2008 | Caamano et al. | |
| 7,422,463 B2 | 9/2008 | Kuo | |
| 7,503,338 B2 | 3/2009 | Harrington et al. | |
| 7,510,426 B2 * | 3/2009 | Hwang et al. | 439/501 |
| 7,533,843 B2 | 5/2009 | Caamano et al. | |
| D599,290 S | 9/2009 | Lee | |
| 7,607,603 B1 | 10/2009 | Chang | |
| 7,625,241 B2 * | 12/2009 | Axland et al. | 439/640 |
| 7,657,499 B2 | 2/2010 | Newman et al. | |
| 7,692,904 B2 | 4/2010 | Li et al. | |
| D617,272 S | 6/2010 | The | |
| 7,751,161 B2 | 7/2010 | Williams | |
| 7,973,538 B2 | 7/2011 | Karam | |
| 8,007,295 B2 * | 8/2011 | Lin | 439/131 |
| D651,977 S | 1/2012 | Lee | |
| 8,123,010 B2 | 2/2012 | Skowronski et al. | |
| 8,201,673 B2 | 6/2012 | Caamano et al. | |
| 8,302,895 B2 | 11/2012 | Inman | |
| D685,328 S | 7/2013 | Kirtland | |
| 8,489,622 B2 | 7/2013 | Joshi | |
| 8,500,492 B2 * | 8/2013 | Brown et al. | 439/638 |
| D692,382 S | 10/2013 | Liu | |
| D692,829 S | 11/2013 | Dobler | |
| 2007/0255833 A1 | 11/2007 | Sharma | |
| 2008/0223951 A1 | 9/2008 | Tracey et al. | |
| 2012/0049653 A1 | 3/2012 | Tracey et al. | |
| 2013/0032654 A1 | 2/2013 | Tracey et al. | |
| 2013/0171866 A1 | 7/2013 | Tracey et al. | |

OTHER PUBLICATIONS

Masterplug Switched 4 Socket Cable Reel, accessed on Nov. 2, 2011 at http://www.screwfix.com/p/masterplug-switched-4-socket-cable-reel-work-power-30m-13.

Master Plug Performance 2 Socket Cable Extension Reel, accessed on Nov. 2, 2011 at http://www.ck-supplies.com/index.php?catID=1233&prodID=7168.

International Preliminary Report on Patentability for PCT application No. PCT/US2012/049628, dated Feb. 11, 2014.

* cited by examiner

ELECTRICAL CORD REEL WITH REMOVEABLE CORD

INCORPORATION BY REFERENCE

The present application claims priority to U.S. Provisional Patent Application No. 61/582,768 filed on Jan. 3, 2012 and entitled "Electrical Cord With Removable Cord" and U.S. Provisional Patent Application No. 61/609,178 filed on Mar. 9, 2012 and entitled "Electrical Cord With Removable Cord," the entire contents of both of which are each incorporated herein by reference and should be considered a part of this specification. The present application incorporates by reference the entire disclosures of U.S. Pat. No. 7,320,843 to Harrington; U.S. Pat. No. 7,350,736 to Caamano et al.; U.S. Pat. No. 7,419,038 to Caamano et al.; U.S. Pat. No. 7,503,338 to Harrington et al.; and U.S. Pat. No. 7,533,843 to Caamano et al.; U.S. Patent Application Publication No. US2008/0223951A1 to Tracey et al.; U.S. patent application Ser. No. 13/216,673 filed Aug. 24, 2011 to Tracey; and U.S. Provisional Patent Application Nos. 61/515,727 filed Aug. 5, 2011 to Tracey et al.; 61/515,799 filed Aug. 5, 2011 to Tracey et al.; and 61/582,141, filed Dec. 30, 2011.

BACKGROUND

1. Field

The present application relates generally to electrical cord reels, and specifically to methods of connecting an electrical cord to a reel.

2. Description of the Related Art

Electrical cord reels typically include a direct electrical connection between the wound cord and the reel's drum. This connection often produces discontinuities in the spool of cord, leading to unsmooth operation and suboptimal spool capacity.

SUMMARY

In one aspect, the present disclosure provides an electrical cord reel comprising a spool member, a plurality of electrically conductive reel contacts, and an electrical cord. The spool member has an outer cylindrical surface and is rotatable about a longitudinal center axis of the spool member. The cylindrical surface has a recess defined by a floor. The spool member has a trench formed within the cylindrical surface, the trench having first and second ends. At the first end, the trench extends into the recess. The trench extends substantially circumferentially from the recess. The electrically conductive reel contacts are accessible via the recess. The cord comprises an elongated cord segment and a connector connected to an end portion of the cord segment. The cord segment has a plurality of wires. The connector has a reel-engagement position in which the connector resides within the recess of the spool member. The connector is securable to the spool member by at least one screw to facilitate selective attachment and removal of the connector with respect to the spool member. The connector includes a plurality of electrically conductive cord contacts equal in number to the reel contacts. When the connector is in the reel-engagement position: (1) an inner major surface of the connector mates closely with the floor of the recess; (2) an outer major surface of the connector replaces at least a majority of the spool member's cylindrical surface that is not included due to the presence of the recess; (3) the end portion of the cord segment resides within the trench; (4) each of the cord contacts connects electrically with a different one of the reel contacts; and (5) the reel is configured to convey electrical power from an external power source to the reel contacts and to the cord contacts and the wires of the cord segment.

Electrical cord reels disclosed herein comprise a spool member having an outer cylindrical surface, the spool member being rotatable about a center axis of the spool member, the cylindrical surface having a recess defined by a floor, the spool member having a trench formed within the cylindrical surface, the trench having first and second ends, the trench at the first end extending into the recess, the trench extending substantially circumferentially from the recess. The electrical cord reels further comprise a plurality of electrically conductive reel contacts accessible via the recess. The electrical cord reels further comprise an electrical cord configured to be wound on the outer cylindrical surface of the spool member. The electrical cord comprises a cord segment having a plurality of wires. The electrical cord further comprises a connector connected to an end portion of the cord segment, the connector having a reel-engagement position in which the connector resides within the recess of the spool member, the connector being securable to the spool member by at least one screw to facilitate selective attachment and removal of the connector with respect to the spool member, the connector including a plurality of electrically conductive cord contacts equal in number to the reel contacts. When the connector is in the reel-engagement position, an inner major surface of the connector mates with the floor of the recess; an outer major surface of the connector replaces at least a majority of the spool member's cylindrical surface that is not included due to the presence of the recess; the end portion of the cord segment resides within the trench; each of the cord contacts connects electrically with a different one of the reel contacts; and the reel is configured to convey electrical power from an external power source to the reel contacts and to the cord contacts and the wires of the cord segment.

In some embodiments, when the connector is in the reel-engagement position, the outer major surface of the connector is substantially flush with the spool member's cylindrical surface; the reel contacts are disposed within a perimeter wall of the recess, the perimeter wall circumscribing the floor of the recess; the reel contacts are disposed within prong apertures formed in the perimeter wall; the connector includes a perimeter wall extending from the inner major surface to the outer major surface, the perimeter wall of the connector configured to closely mate with the perimeter wall of the recess when the connector is in the reel-engagement position; the perimeter wall of the connector comprises first and second substantially flat wall portions on opposing ends of the connector, the cord contacts being disposed within the first wall portion, the end portion of the cord segment being connected to the second wall portion; the electrical cord reels further comprise a first connector screw hole extending through the first wall portion of the connector; the electrical cord reels further comprise a first reel screw hole within the perimeter wall of the recess, the first reel screw hole configured to align with the first connector screw hole when the connector is in the reel-engagement position; the electrical cord reels further comprise a first flange extending from the second wall portion of the connector; the electrical cord reels further comprise a second connector screw hole extending through the first flange; the electrical cord reels further comprise a second reel screw hole within the spool member, the second reel screw hole being configured to align with the second connector screw hole when the connector is in the reel-engagement position; the recess includes a first shoulder on a side of the trench, the first shoulder having a radially outer surface radially positioned between the floor of the recess and the cylindrical surface of the spool, the second reel screw hole being formed within the radially outer surface of the first shoulder such that, when the at least one screw is in the second reel screw hole, the at least one screw does not radially protrude beyond the cylindrical surface of the spool; the at least one screw comprises a first screw configured to extend through the first connector screw hole and the first reel screw hole; the at least one screw further comprises a second screw configured to extend through the second connector screw hole and the second reel screw hole; the electrical cord reel can further comprise a second flange extending from the second wall portion of the connector on an opposing side of the end portion of the cord segment with the first flange; the electrical cord reel can further comprise a third connector screw hole extending through the second flange; the electrical cord reel can further comprise a third reel screw hole within the spool member, the third reel screw hole configured to align with the third connector screw hole when the connector is in the reel-engagement position; the recess can include a pair of shoulders on opposing sides of the trench, the shoulders having radially outer surfaces radially positioned between the floor of the recess and the cylindrical surface of the spool, the second reel screw hole being formed within the radially outer surface of a first shoulder of the pair of shoulders, and the third reel screw hole being formed within the radially outer surface of a second shoulder of the pair of shoulders, such that, when the at least one screw is in the second reel screw hole or the third reel screw hole, the at least one screw does not radially protrude beyond the cylindrical surface of the spool; the at least one screw comprises a first screw configured to extend through the first connector screw hole and the first reel screw hole; the at least one screw comprises a second screw configured to extend through the second connector screw hole and the second reel screw hole; the at least one screw can comprise a third screw configured to extend through the third connector screw hole and the third reel screw hole; the floor of the recess is curved to generally match a curvature of the outer cylindrical surface of the spool member; the trench includes a floor whose distance from the center axis tapers from a first distance at the first end of the trench to a second distance at the second end of the trench, the second distance being longer than the first distance and being equal to a radius of the cylindrical surface of the spool member; the plurality of wires comprises a ground wire, a hot wire, and a neutral wire; the plurality of wires can further comprise at least one signal wire; and/or the number of reel contacts can be equal to the number of cord contacts and can be also equal to the number of wires of the plurality of wires of the cord segment.

Electrical cord reels disclosed herein comprise a spool member rotatable about a winding axis, the spool member comprising a spool surface having a depression. The electrical cord reels further comprise an electrical cord configured for spooling on the spool surface of the spool member. The electrical cord comprises a cord segment having a wire. The electrical cord further comprises an adapter on an end of the electrical cord and connected to the cord segment, the adapter configured to be removably disposed in the depression. An electrical connection is formed between the electrical cord reel and the electrical cord when the adapter is disposed in the depression. Rotation of the spool member causes a translational movement of the electrical cord at least partially through movement of the adapter along with the spool surface when the adapter is in the depression.

In some embodiments, the adapter comprises a top surface at least partially flush with the spool surface when the adapter is in the depression such that kinks in the electrical cord are minimized when the electrical cord is wound onto the spool member; the adapter comprises a perimeter wall between a top surface and a bottom surface of the adapter, and the depression comprises a perimeter wall bounding a lower surface of the depression; the perimeter wall of the depression engages the perimeter wall of the adapter to at least partially cause movement of the adapter when the spool member rotates such that the perimeter wall of the depression and the perimeter wall of the adapter at least partially bear loads resulting from movement of the adapter when the adapter is in the depression and the spool member rotates; at least a portion of the perimeter wall of the adapter is substantially perpendicular to the spool surface when the adapter is in the depression; the adapter further comprises a cord prong extending from the perpendicular portion of the perimeter wall of the adapter along a direction substantially perpendicular to the perpendicular portion of the perimeter wall of the adapter such that the loads resulting from movement of the adapter when in the depression are minimized on the cord prongs by the loads acting substantially parallel to the extension direction of the cord prongs; the adapter comprises a first adapter connector hole, and the depression comprises a first depression connector hole; the first adapter connector hole and the first depression connector hole are configured to accept a first connector to secure the adapter in the depression; the first adapter connector hole and the first depression connector hole are configured to orient the first connector substantially perpendicular to a radius of the spool member from the winding axis; the adapter comprises a cord prong configured to form the electrical connection between the electrical cord reel and the electrical cord when the adapter is in the depression, the cord prong projecting from the adapter in a direction substantially parallel with the first connector when the first connector is in the first adapter connector hole and the first depression connector hole such that loads resulting from movement of the adapter when the adapter is in the depression and the spool member rotates are minimized on the first connector and the cord prong; the adapter comprises a second adapter connector hole, and the depression comprises a second depression connector hole; the second adapter connector hole and the second depression connector hole are configured to accept a second connector to secure the adapter in the depression; and/or second connector is oriented substantially parallel to the first connector when the second connector is in the second adapter connector hole and the second depression connector hole and when the first connector is in the first adapter connector hole and the first depression connector hole, such that the second connector acts in parallel with the first connector to secure the adapter in the depression and inhibits loads on one or more cord prongs of the adapter as the spool member is rotated.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the some embodiments having reference to the attached figures, the invention not being limited to any particular embodiment(s) disclosed.

DETAILED DESCRIPTION

Figure 1:
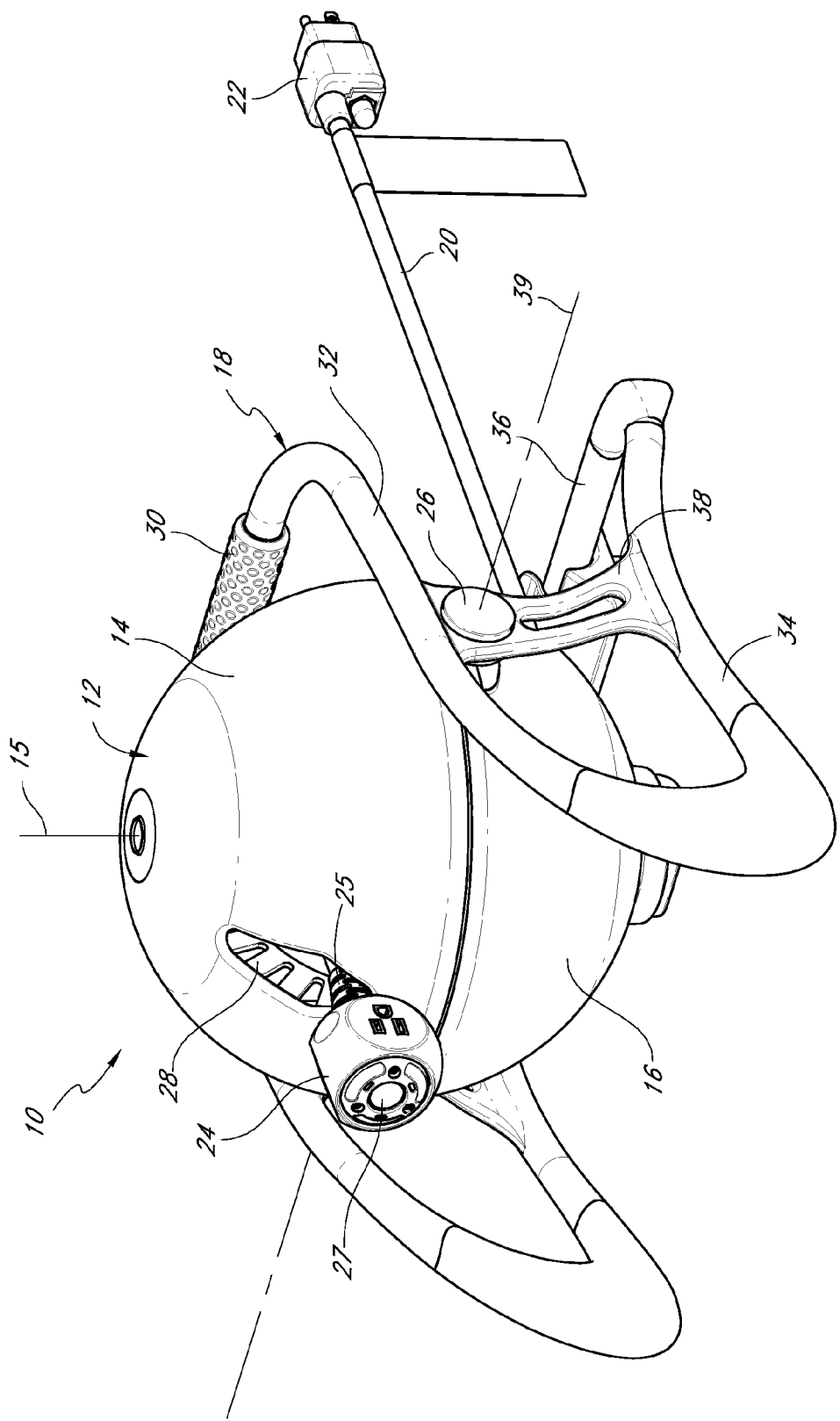
FIG. 1 is a perspective view of an embodiment of an electrical cord reel.

FIG. 1 is a perspective view of an embodiment of an electrical cord reel 10. The reel 10 includes a housing 12 that substantially encloses various reel components. In the illustrated embodiment, the housing 12 is substantially spherical, but it will be understood that the housing can have other shapes. The illustrated housing 12 comprises an upper portion 14 and a lower portion 16, but it will be appreciated that the housing 12 can comprise more than two major portions. In the illustrated embodiment, each portion 14 and 16 is substantially semispherical. In some embodiments, the housing portions 14 and 16 can rotate with respect to each other about a housing axis 15. Further details of embodiments of the housing 12, including structure to facilitate relative rotation between portions 14 and 16 about axis 15, are disclosed in U.S. Pat. No. 7,533,843 to Caamano et al.

The reel 10 can include a support structure for supporting the reel with respect to a support surface, such as the ground, a tabletop, or even a wall or ceiling. A mounting element can be provided to secure the support structure with respect to a vertical wall or a ceiling. Examples of support structures and a compatible mounting element for mounting the reel to a wall or ceiling are provided in U.S. Pat. No. 7,419,038 to Caamano et al. and U.S. Patent Application No. 61/515,799 filed Aug. 5, 2011.

The illustrated reel 10 has a support structure 18 comprising a rear handle portion 30, a pair of side arm portions 32, a pair of side foot portions 34, and a rear foot portion 36. The side arm portions 32 and side foot portions 34 can be positioned on opposing sides of the housing 12. The rear handle portion 30 may include a grip cover (e.g., formed of rubber) to make it easier to grip the portion 30. Also, the transitions between the arm portions 32 and the foot portions 34 and/or the transitions between the side foot portions 34 and the rear foot portion 36, can be enclosed within tubular covers (e.g., rubber covers) to reduce how much the support structure 18 gets scratched and scratches other surfaces, as well as to reduce the tendency of the reel 10 to slide upon a support surface. The support structure 12 can further include connections 38 between the side arm portions 32 and the side foot portions 34, to further rigidify the support structure 18. In some embodiments, the housing 12 is rotatably mounted to the support structure 18 at a pair of connections 26 on opposing sides of the housing, so that the housing 12 is configured to rotate at least partially with respect to the support structure 18 about a substantially horizontal axis 39 extending through connections 26.

The reel 10 can include an input electrical power cord 20 with an input power connector 22 (illustrated as a standard electrical plug) configured to be mechanically and electrically coupled to an electrical power source, such as a standard electrical outlet. It will be appreciated that the input power connector 22 need not be provided on an input cord 20. For example, the electrical power source can comprise a battery or battery pack, and the input power connector 22 can comprise terminals for connection thereto. In such embodiments, the battery or battery pack may be enclosed within the housing 12. A suitable battery structure is disclosed in U.S. Pat. No. 7,320,843 to Harrington. It will be appreciated that the reel 10 can include a first input power connector for connecting to a battery, and/or a second input power connector 22 of an electrical cord 20.

The reel 10 can be configured to spool an output electrical cord 25 (FIGS. 1, 5, 7-9B). As discussed herein, the reel 10 is configured to convey electrical current from the input power connector 22 to the electrical cord 25. The electrical cord 25 can include an electrical plug receptacle 24 with one or more terminals for mechanically and electrically coupling to power cords of devices that receive electrical power from the cord 25. Each such terminal can include a plurality of apertures for receiving prongs of an electrical plug, such as a hot wire prong, a neutral wire prong, and a ground prong, as known in the art. While each terminal of the illustrated electrical plug receptacle 24 includes three prongs for receiving a standard three-prong electrical plug for electrical power conveyance, in other embodiments a terminal of the receptacle 24 can include fewer apertures (e.g., one or two apertures) for receiving one or more prongs for other purposes (e.g., electrical signal transmissions).

The housing 12 can include an aperture 28 through which the cord 25 may extend when partially wound about a spool member 40 (FIG. 2, described below) within the housing 12. In the illustrated embodiment, the aperture 28 is formed within the upper housing portion 14.

Figure 2:
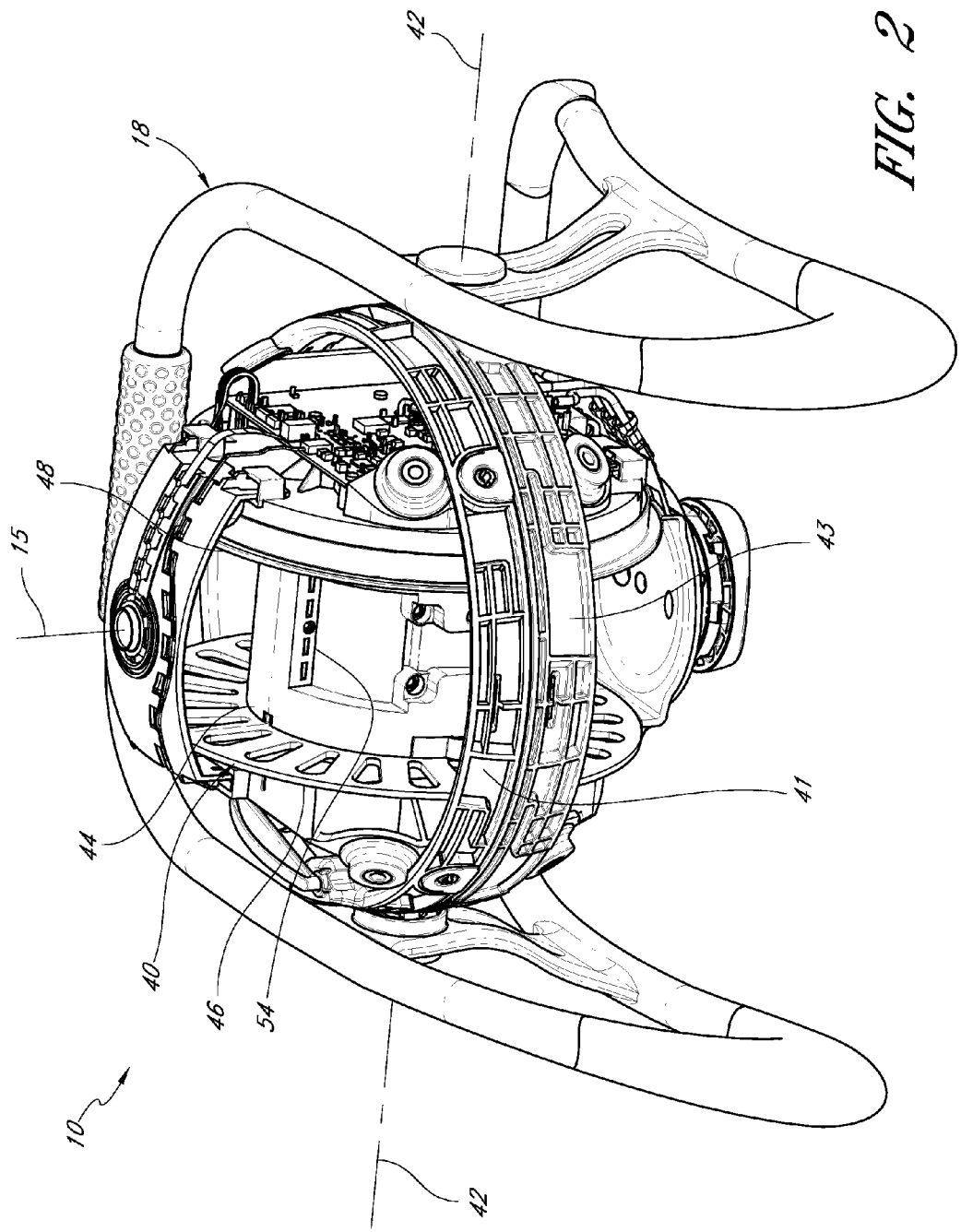
FIG. 2 is a perspective view of an embodiment of a cord reel showing internal components.

FIG. 2 shows the cord reel 10 with the upper housing portion 14 and lower housing portion 16 removed to reveal interior components. The illustrated reel 10 can include an upper circular rail 41 that attaches to the lower portion of the upper housing portion 14 and/or a lower circular rail 43 that attaches to the upper portion of the lower housing portion 16. The upper rail 41 and lower rail 43 (and their respective housing portions) can rotate with respect to one another about the housing axis 15, by employing, for example, wheels, ball bearings, and/or other elements to facilitate such rotation.

The housing 12 (FIG. 1) can substantially enclose a spool member 40 configured to rotate about a winding axis 42 to spool and unspool an electrical cord 25 (or other flexible linear materials) about the spool member 40. The cord 25 can be configured to become spooled onto the spool member 40 when the spool member 40 rotates in a first direction about the winding axis 42, and to become unspooled from the spool member 40 when the spool member 40 rotates in a second direction about the winding axis 42, the second direction being opposite the first direction. The housing 12 can enclose the spool member 40, an output power connector 54, and/or a motor (not shown). The motor can be positioned within the spool member 40, as disclosed in U.S. patent application Ser. No. 13/216,673 filed Aug. 24, 2011. The winding axis 42 can be a longitudinal center axis of the spool member 40. The winding axis 42 can be collinear or parallel to the horizontal axis 39 (FIG. 1). In some embodiment, the spool member 40 and its winding axis 42 can rotate about the housing axis 15 relative to the support structure 18 and lower housing portion 16. In the illustrated embodiment, the spool member 40 comprises a generally cylindrical drum 44 and a pair of circular plates 46 and 48 sandwiching the drum 44. It will be appreciated that the drum 44 need not be cylindrical.

In some embodiments, the reel 10 includes a reciprocating mechanism that causes the spool member 40 to rotate back and forth in a reciprocating fashion about the housing axis 15 (regardless of whether the housing portions 14 and 16 are configured to rotate with respect to one another about the axis 15) with respect to the portion of the housing 12 having the aperture 28 (in the illustrated embodiment, the upper housing portion 14). The reciprocating mechanism can promote more uniform winding of the cord 25 onto the spool member 40 and/or minimize kinks or bends in the cord segment 60. The reciprocating mechanism can produce a reciprocating rotation of the spool member 40 about the axis 15 while the spool member 40 is rotating about the winding axis 42. An exemplary reciprocating mechanism is disclosed in U.S. Pat. No. 7,533,843 to Caamano et al.

Figure 3:
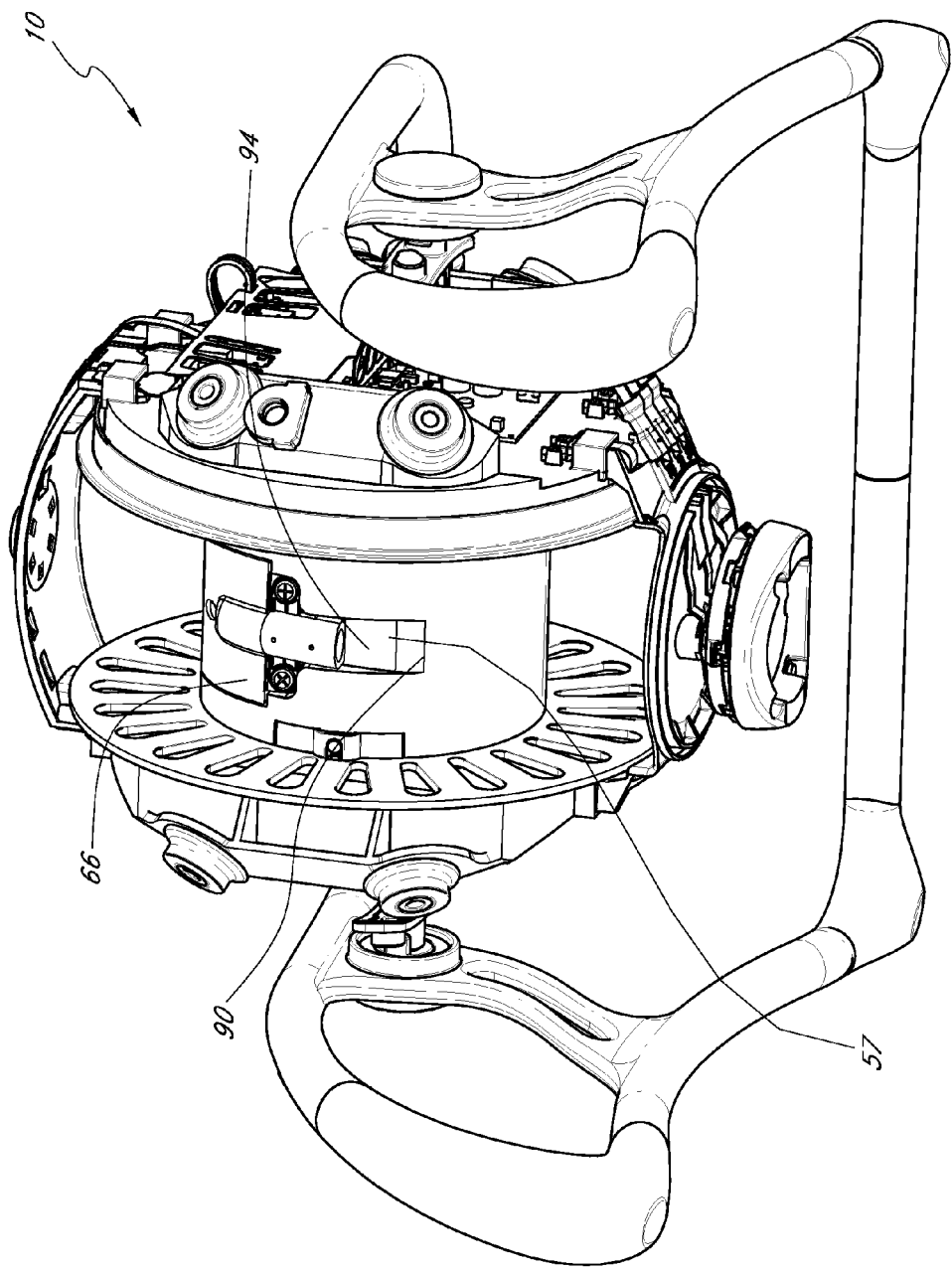
FIG. 3 is a perspective view of an embodiment of a cord reel showing internal components.
Figure 4:
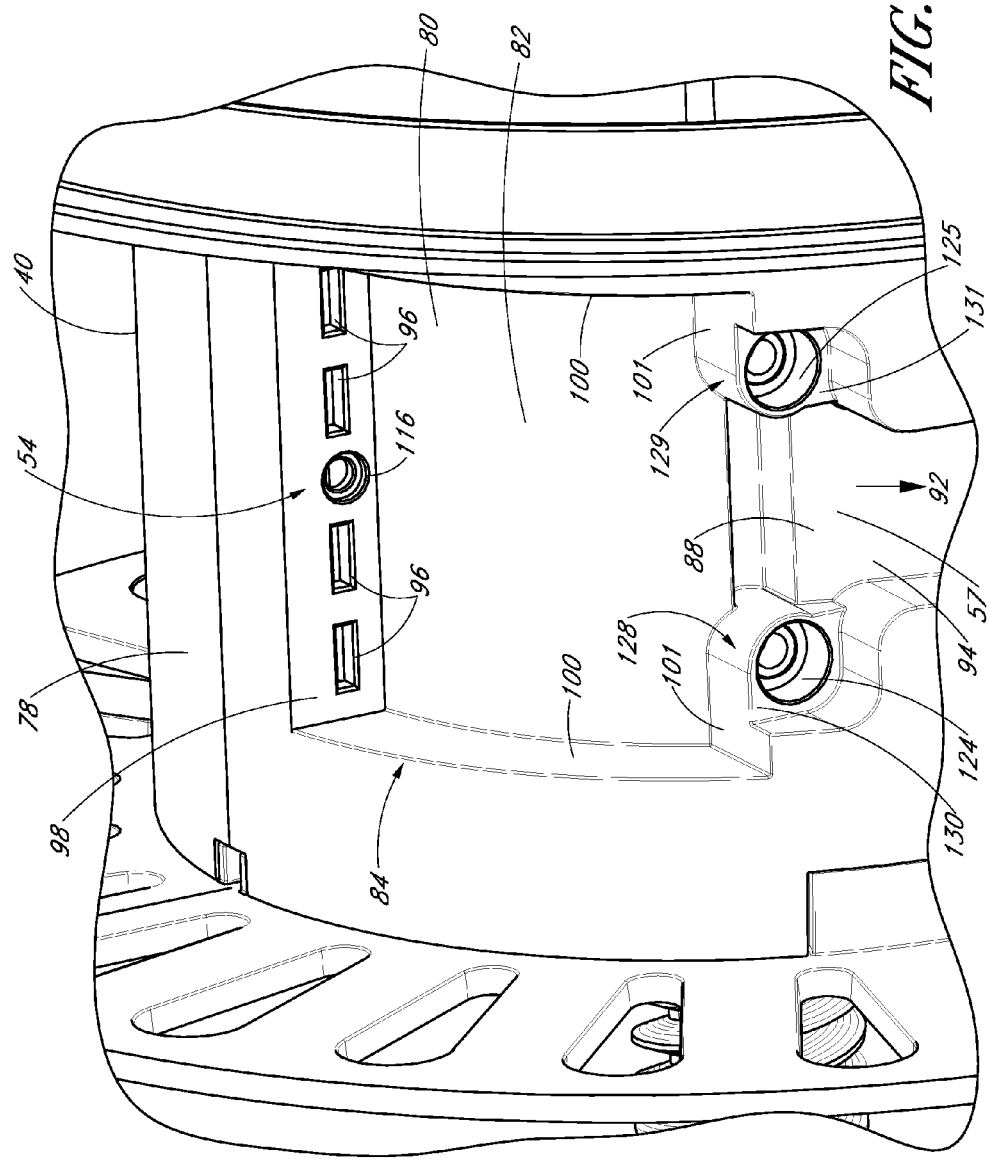
FIG. 4 is a perspective view of an embodiment of an output power connector of a cord reel.

Referring to FIGS. 2-4, the output power connector 54 can be on the spool member 40. The output power connector 54 can be configured to be mechanically and electrically coupled to the output electrical cord 25. The reel 10 can be configured to convey electrical current from the input power connector 22 (FIG. 1) to the output power connector 54. The power connector 54 can include a terminal for electrical connection with the electrical cord 25. In some embodiments, a channel, recess, and/or trench 57 can be provided to accommodate an end portion of the electrical cord 25, so as to reduce an extent to which the connection of the cord 25 and the output power connector 54 produces a variation in the profile of the surface onto which the cord is spooled. Further details of the output power connector 54 are discussed below.

Figure 5:
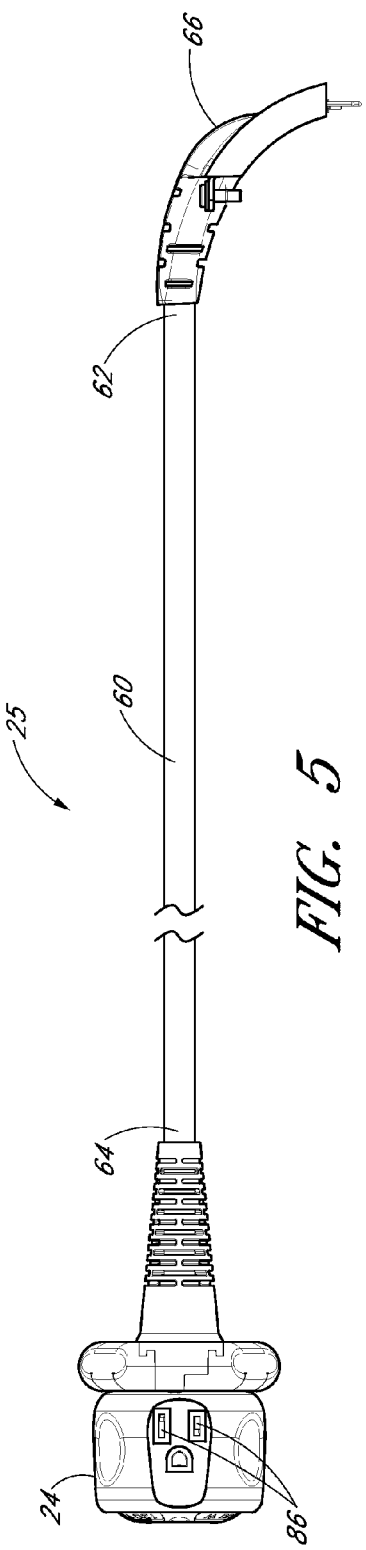
FIG. 5 is a side view of an embodiment of an electrical cord.

FIG. 5 is a side view of an embodiment of an electrical cord 25. The cord 25 can include a cord segment 60 having a first end portion 62 and a second end portion 64. A connector 66 is connected to the first end portion 62, and the electrical plug receptacle 24 is connected to the second end portion 64. While the length of the cord segment 60 in FIG. 5 is illustrated to be relatively short, skilled artisans will understand that such length can be much longer in practice, such as 25-150 feet.

Figure 6:
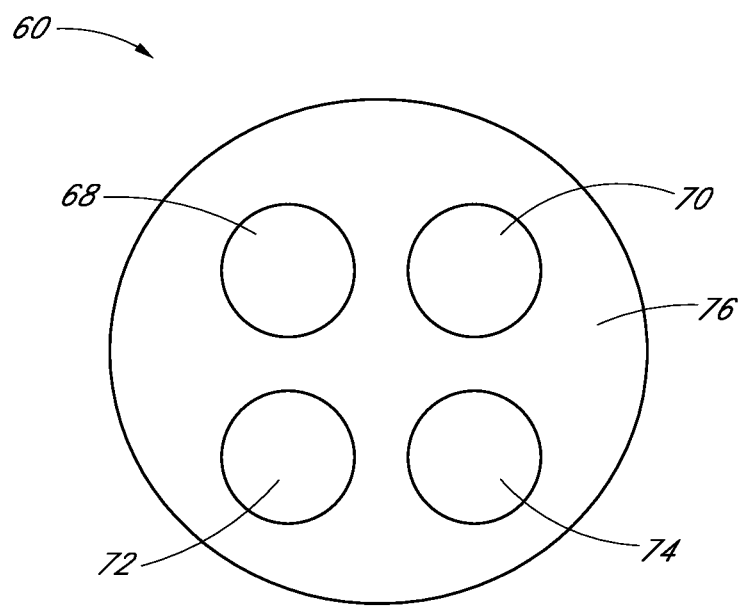
FIG. 6 is a transverse cross-sectional view of an embodiment of an electrical cord segment.

Referring to FIGS. 5 and 6, the cord segment 60 can include a plurality of wires. In some embodiments, the cord segment 60 of a power or electrical cord 24 can include at least a hot wire, a neutral wire, and a ground wire, as known in the art. One or more additional wires can also be provided, such as signal wires as disclosed in U.S. Provisional Patent Application No. 61/515,727 filed Aug. 5, 2011. In some embodiments, the cord segment 60 can comprise insulation that prevents the wires from making undesirable electrical contact with exterior surfaces, as known in the art. For example, FIG. 6 shows a cross-section of an embodiment of a cord segment 60 comprising a hot wire 68, neutral wire 70, ground wire 72, and signal wire 74 within insulation 76.

With reference to FIG. 5, the electrical plug receptacle 24 can be connected to the second end 64 of the illustrated cord segment 60. The receptacle 24 can include apertures 86 configured to receive prongs of at least one electrical plug (not shown) to form an electrical connection between the plug and the wires of the cord segment 60. The apertures 86 can comprise a hot prong aperture, a neutral prong aperture, and a ground aperture, as known in the art. Further details of some embodiments of the receptacle 24 are disclosed in U.S. Provisional Patent Application No. 61/582,141, filed Dec. 30, 2011.

Figure 7:
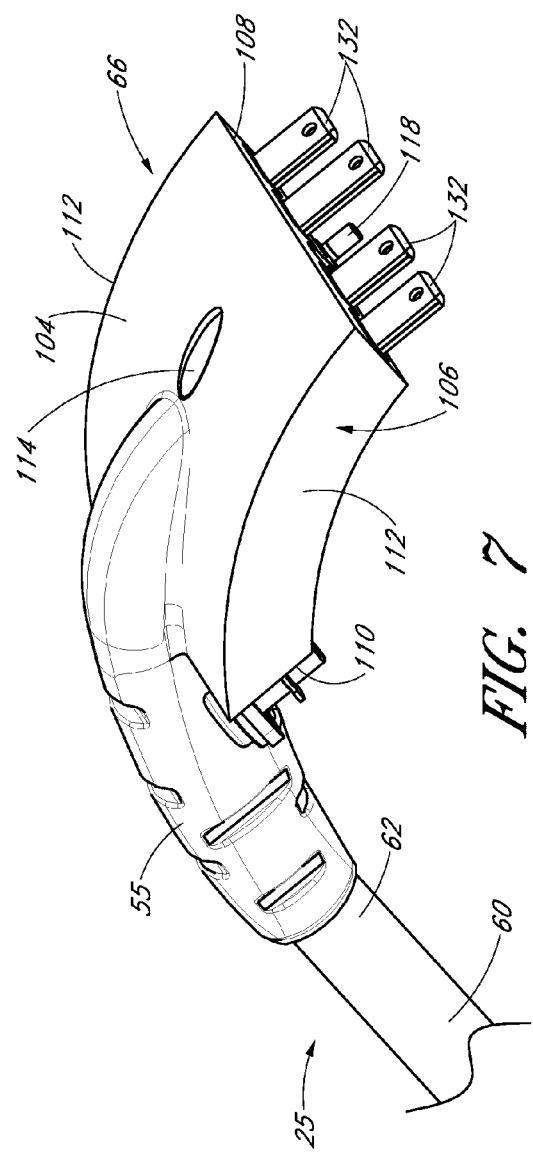
FIG. 7 is a top perspective view of an embodiment of a reel-engaging end of an electrical cord.
Figure 8:
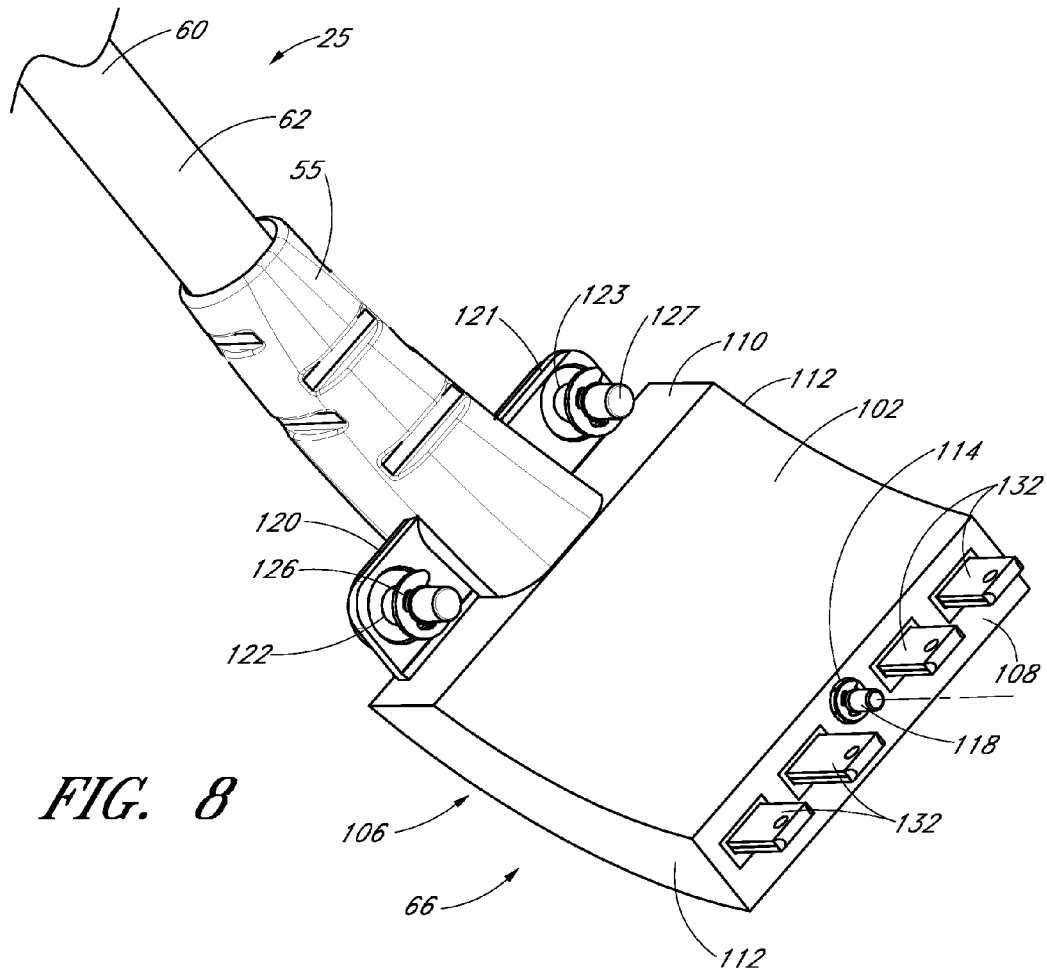
FIG. 8 is a bottom perspective view of an embodiment of a reel-engaging end of an electrical cord.

With reference to FIGS. 5, 7, and 8, the connector 66 can be configured to be connected to the output power connector 54 of the spool member 40, so that the reel 10 is configured to convey electrical power to the connector 66. In the illustrated embodiment, the connector 66 includes a tubular element 55 that receives the cord's first end portion 62 to strengthen and/or stabilize the connection. The connector 66 can be removably electrically connected to the output power connector 54, such that the output power connector 54 can convey electrical power to the wires of the cord segment 60 via the connector 66.

Referring to FIG. 4, the output power connector 54 is now described in greater detail. In the illustrated embodiment, the spool member 40 has an outer cylindrical surface 78 having a recess 80 sized and configured to receive the connector 66 of the output electrical cord 25. The presence of the recess 80 causes a portion of the spool member's cylindrical surface 78 to not be included in the spool member 40. The recess 80 can be defined at least partly by a floor 82. In the illustrated embodiment, the recess 80 is further defined by a perimeter wall 84 that circumscribes the floor 82. The recess 80 and perimeter wall 84 can be generally square-shaped or rectangle-shaped (within the context of being formed within a cylindrical or otherwise shaped spool member), as shown. In the illustrated embodiment, the perimeter wall 84 includes a substantially flat wall portion 98, a pair of substantially flat side wall portions 100, and a pair of substantially flat wall portions 101 on opposite sides of the trench 57. In some embodiments, the recess 80 and perimeter wall 84 can have any other suitable shape, with or without flat wall portions. In some embodiments, the recess 80 and perimeter wall 84 can be any suitable shape to engage and/or mate with the connector 66 as discussed herein. The floor 82 can be curved to generally match a curvature of the outer cylindrical surface 78 of the spool member 40 (e.g., the floor 82 can have a circular arc profile). In some embodiments, the floor 82 can have any other suitable shape, such as, for example, to match the contour and/or curvature of any contact surface of connector 66 as discussed herein, including being flat or straight.

Reference is now made to FIGS. 3 and 4. As noted above, the spool member 40 can have a trench 57 formed within the cylindrical surface 78. The trench 57 can receive the first end portion 62 of the cord 25, including the tubular element 55, when the connector 66 is positioned within the recess 80, as described below. FIG. 3 illustrates the connector 66 positioned within the recesses 80 with the cord segment 60 and other components on the second end portion 64 removed for illustration purposes. At least a portion of the connector 66 can be made flush with and/or follow the contour and/or curvature of the cylindrical surface 78 of the spool member 40 to promote more uniform winding of the cord 25 on the spool member 40 and/or minimize kinks or bends in the cord segment 60.

The trench 57 can have a first end 88 and a second end 90. At the first end 88, the trench 57 can extend into the recess 80. The trench 57 can extend substantially circumferentially from the recess 80, in a direction denoted by the arrow 92 in FIG. 4. In certain embodiments, the trench 57 includes a floor 94 whose distance from the spool member's center axis 42 (FIG. 2) tapers from a first distance at the first end 88 of the trench 57 to a second distance at the second end 90 of the trench 57. The second distance can be longer than the first distance. The second distance can be equal to a radius of the cylindrical surface 78 of the spool member 40. In some embodiments, the radial position of the floor 94 can vary along the length of the trench 57, so that the cord 25 gradually and smoothly ramps up from the recess 80 to the radius of the cylindrical surface 78 along, for example, the direction of arrow 92. The gradual and smooth ramp of the trench 57 can gradually and smoothly raise the cord segment 60 from the radial position of the floor 82 of the recess 80 to the radial position of the cylindrical surface 78 of the spool member 80. The features of the trench 57 as discussed herein can promote more uniform winding of the cord 25 on the spool member 40 and/or minimize kinks or bends in the cord segment 60. Further, the features of the trench 57 as discussed herein can help reduce bending or shear forces on the first end portion 62 of the cord segment 60 such as, for example, reducing forces on the tubular element 55 and/or the electrical extensions 134 when the connector 66 is the reel-engagement position with the recess 80 to help promote better electrical connectivity over an extended period of time Referring to FIG. 4, the cord reel 10 can include a plurality of electrically conductive "reel contacts" accessible via the recess 80. For example, the reel contacts can be disposed within the perimeter wall 84 and/or the floor 82 of the recess 80. In some embodiments, the reel contacts can be disposed within prong apertures formed in the recess 80, such as in the perimeter wall 84 and/or floor 82. In the illustrated embodiment, the reel contacts are disposed within prong apertures 96 formed in the wall portion 98 of the perimeter wall 84 of the recess 80, with one reel contact within each aperture 96. As described below, the prong apertures 96 can be configured to receive and make electrical contact with prongs of the connector 66. In some embodiments, the reel 10 can be configured to convey electrical power from an external power source (e.g., via input power cord 20, FIG. 1) and/or electronic signals to the reel contacts, for further conveyance to and/or from the wires of the cord segment 60 of the electrical cord 25, as described below.

With reference to FIGS. 4-8, the connector 66 of the electrical cord 25 can have a reel-engagement position in which the connector 66 resides within the recess 80 of the spool member 40, and in which the first end portion 62 of the cord segment 60 and/or the tubular element 55 can reside within the trench 57. In the illustrated embodiment, the connector 66 includes an inner major surface 102, an outer major surface 104, and a perimeter wall 106 extending from the inner major surface 102 to the outer major surface 104. The inner major surface 102 can be configured to mate closely with the floor 82 of the recess 80 when the connector 66 is in its reel-engagement position. For example, the inner major surface 102 can generally follow the contour and/or curvature of the floor 82 of the recess 80.

The perimeter wall 106 of the connector 66 can be configured to closely mate with the perimeter wall 84 of the recess 80 when the connector 66 is in its reel-engagement position. For example, the perimeter wall 106 of the connector 66 can follow the contour and/or curvature of the perimeter wall 84 of the recess 80. Accordingly, in the illustrated embodiment, the perimeter wall 106 comprises a first substantially flat wall portion 108, a second substantially flat wall portion 110, and a pair of side wall portions 112. The first and second wall portions 108 and 110 can be on opposing ends of the connector 106. The first end portion 62 of the cord segment 60 can be connected to the second wall portion 110, such as by using a tubular element 55 as disclosed herein. When the connector 66 is in its reel-engagement position, the first wall portion 108 can closely mate with the wall portion 98 of the perimeter wall 84 of the recess 80, the second wall portion 110 can closely mate with the wall portions 101 of the perimeter wall 84, and/or the side wall portions 112 can closely mate with the side wall portions 100 of the perimeter wall 84. For example, the first wall portion 108 can follow the contour and/or curvature of the wall portion 98 of the perimeter wall 84 of the recess 80; the second wall portion 110 can follow the contour and/or curvature of the wall portions 101 of the perimeter wall 84; and/or the side wall portions 112 can follow the contour and/or curvature of the side wall portions 100 of the perimeter wall 84.

As noted above, the presence of the recess 80 causes a portion of the spool member's cylindrical surface 78 to not be included in the spool member 40. In certain embodiments, when the connector 66 is in its reel-engagement position, the outer major surface 104 replaces at least a majority (and in some embodiments substantially all) of the cylindrical surface 78 that is not included due to the presence of the recess 80. This helps to reduce the impact of the recess 80 on the smoothness of the winding of the cord 25 onto the spool member 40 to promote more uniform winding of the cord 25 onto the spool member 40 and/or minimize kinks or bends in the cord segment 60.

Figure 9A:
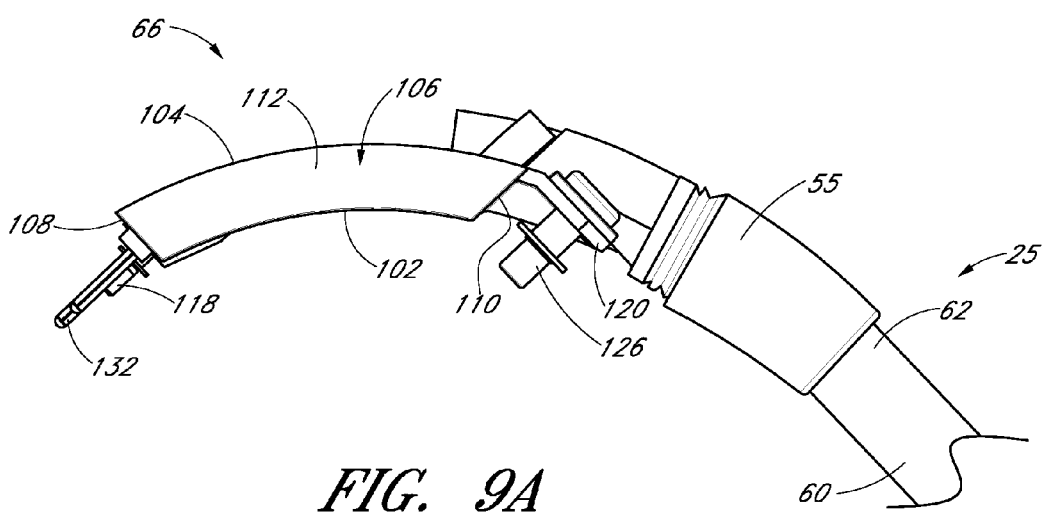
FIG. 9A is a side view of an embodiment of a reel-engaging end of an electrical cord.
Figure 9B:
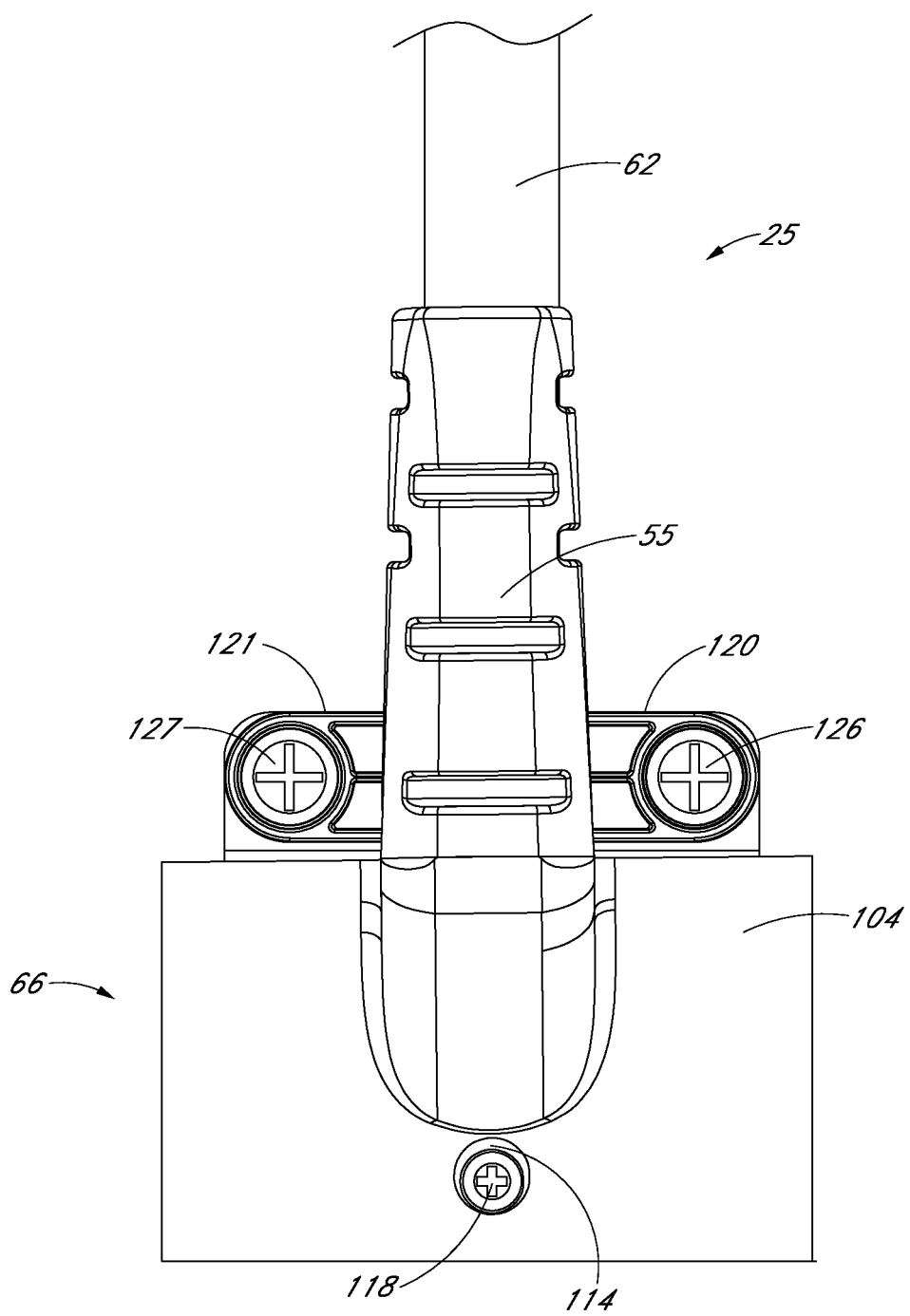
FIG. 9B is a top view of an embodiment of a reel-engaging end of an electrical cord.

The connector 66 can be securable to the spool member 40 by at least one screw to facilitate selective attachment and removal of the connector 66 with respect to the spool member 40. The screw can have threads configured to engage corresponding threads on another member to secure the screw upon turning the screw. In some embodiments, the screw can be a connector using any suitable connection mechanism to secure the connector 66 in the recess 80, including threads and/or an interference fit or snap-fit mechanisms that secure the screw and/or connector to a corresponding member upon depressing and/or turning the screw and/or connector. In the illustrated embodiment, a first connector screw hole 114 extends through the first wall portion 108 of the connector 66. The screw hole 114 can have one end at the first wall portion 108, and another end at the outer major surface 104. As illustrated in FIGS. 7 and 9B, the end of the screw hole 114 at the outer major surface 104 can generally follow the contour the outer major surface while still providing a generally full circular opening for insertion of a first screw 118. The recess 80 can include a first reel screw hole 116 configured to align with the first connector screw hole 114 when the connector is in its reel-engagement position. The reel screw hole 116 can be located within the perimeter wall 84 of the recess 80, such as in the wall portion 98 as shown in FIG. 4. A first screw 118 can be configured to extend through the first connector screw hole 114 and the first reel screw hole 116 to secure the connector 66 to the spool member 40 in its reel-engagement position within the recess 80. In some embodiments, a user can adjust the first screw 118 (e.g., using a screwdriver) via the screw hole 114 at the outer major surface 104 of the connector 66.

In some embodiments, the first screw 118 is the only screw provided for securing the connector 66 to the spool member 40. In some embodiments, additional screws are provided. In the illustrated embodiment, a first flange portion 120 extends from the second wall portion 110 of the connector 66 on one side of the first end portion 62, such as the tubular element 55, of the cord segment 60. A second connector screw hole 122 can extend through the first flange portion 120. A second flange portion 121 can extend from the second wall portion 110 of the connector 66 on another and/or opposite side of the first end portion 62, such as the tubular element 55, of the cord segment 60 with the first flange portion 120. A third connector screw hole 123 can extend through the second flange portion 121.

A second reel screw hole 124 can be provided within the spool member 40 and can be configured to respectively align with the second connector screw hole 122 when the connector 66 is in its reel-engagement position. A third reel screw hole 125 can be provided within the spool member 40 and can be configured to respectively align with the third connector screw hole 123 when the connector 66 is in its reel-engagement position. A second screw 126 can be provided to help secure the connector 66 to the spool member 40 in its reel-engagement position within the recess 80. A third screw 127 can be provided to help secure the connector 66 to the spool member 40 in its reel-engagement position within the recess 80. The second screw 126 can be configured to extend through the second connector screw hole 122 and the second reel screw hole 124. The third screw 127 can be configured to extend through the third connector screw hole 123 and the third reel screw hole 125.

In the illustrated embodiment, the recess 80 includes a pair of shoulders, a first shoulder 128 and a second shoulder 129, on opposing sides of the trench 57. The first shoulder 128 can have a first radially outer surface 130. The second shoulder 129 can have a second radially outer surface 131. The first and second shoulders 128, 129 can help position the connector 66 within recess 80 in the reel-engagement position as discussed herein. For example, the first and second shoulders 128, 129 can help orient the connector 66 within the recess 80 such that the tubular element 55 is aligned substantially along the trench 57. Orienting the tubular element 55 along the trench 57 can help reduce stresses on the cord segment 60 by keeping the first end portion 62 oriented in substantially a same position relative to the connector 66 when the electrical cord 25 is spooled or unspooled as discussed herein. The first and second shoulders 128, 129 can act as load bearing members in combination with the perimeter walls 84, 106 as discussed herein when spooling and unspooling the electrical cord 25. The first and second shoulder 128, 129 acting as load bearing members (alone or in combination with orientating the first end portion 62 along the trench 57) can help reduce wear and tear on the first end portion 62 such as, for example, reducing load forces on the electrical extensions 134 and/or tubular element 55 when spooling and unspooling the electrical cord 25 to help promote better electrical connectivity over an extended period of time.

The second reel screw hole 124 can be formed within the first radially outer surface 130 of the first shoulder 128. The third reel screw hole 125 can be formed within the second radially outer surface 131 of the second shoulders 129. The first and second surfaces 130, 131 can have radial positions between those of the floor 82 and the outer cylindrical surface 78 of the spool member 40. In some embodiments, a distance between the spool member's center axis 42 and the cylindrical surface 78 can be longer than a distance (or distances) between the center axis 42 and the first and second radially outer surfaces 130, 131 of the first and second shoulders 128, 129, wherein a distance between the center axis 42 and the floor 82 of the recess 80 is shorter than the distance between the center axis 42 and the first and second radially outer surfaces 130, 131 of the first and second shoulders 128, 129. Having the first and second radially outer surfaces 130, 131 a radial distance (or distances) that is between the floor 82 and the cylindrical surface 78 positions the second and third reel screw holes 124, 125 radially between the floor 82 and the cylindrical surface 78. The second and third reel screw holes 124, 125 can then position the second and third screws 126, 127 radially between the floor 82 and the cylindrical surface 78 when the connector 66 is in the reel-engagement position and the second and third screws 126, 127 are secured into second and third reel screw holes 124, 125, respectively. Positioning the second and third screws 126, 127 radially between the floor 82 and the cylindrical surface 78 can allow the second and third screws 126, 127 (i.e., the heads of the screws) to not radially protrude (or extend) beyond the cylindrical surface 78. With the second and third screws 126, 127 not radially protruding (or extending) beyond the cylindrical surface 78, smoother spooling and unspooling of the electrical cord 25 and/or minimizing kinks or bends in the cord segment 60 when wound around the cylindrical surface 78 can be achieved. It will be appreciated that this is just one example of the configuration and location of the second and third screw holes 124, 125, and other configurations are possible as discussed herein, and in particular, in reference to FIG. 12. In some embodiments, an interference fit or snap-fit mechanism between the perimeter walls 84, 106 can secure (engage and/or mate) the connector 66 within the recess 80 with or without using screws as discussed herein.

In some embodiments, the first, second, and/or third connector screw holes 114, 122, 123 (and correspondingly, the first, second, and/or third reel holes 116, 124, and 125) can be aligned to orient the first, second, and/or third screws 118, 126, 127 in generally a same direction relative to the spool member 40 or the connector 66. As illustrated in FIG. 9B, the first, second, and/or third screws 118, 126, 127 can be screwed or secured via, for example, a screw driver oriented in a same direction from a top perspective of the connector 66. In some embodiments, the prong apertures 96 (and reel contacts) of the recess 80 and cord contacts 132 of the connector 66 can be oriented in the same direction as the first, second, and/or third screws 118, 126, 127.

Engaging the first, second, and/or third screws 118, 126, 127 with the first, second, and/or third reel holes 116, 124, and 125 and/or engaging the cord contacts 132 with the prong apertures 96 can be achieved quickly and efficiently with a single motion generally along the orientation of the first, second, and/or third screws 118, 126, 127. In some embodiments, some of the screws can be substantially perpendicular to a portion of any of the perimeter walls. For example, the first screw 118 can be substantially perpendicular to the first wall portion 108. In some embodiments, some of the screws can be substantially parallel to a portion of any of the perimeter walls. For example, the second and third screws 126, 127 can be substantially parallel to the second wall portion 110.

Once screwed or secured with the connector 66 in the reel-engagement position, the first, second, and/or third screws 118, 126, 127 can help inhibit movement of the connector 66 in a direction generally along the orientation of the first, second, and/or third screws 118, 126, 127 to help retain the connector 66 in an engagement and/or mating position with the recesses 80 as discussed herein, including in the reel-engagement position. In some embodiments, the first, second, and/or third screws 118, 126, 127 and/or perimeter walls 84, 106 generally restrict the direction of engagement and/or mating of the connector 66 with the recesses 80 to be along the orientation of the first, second, and/or third screws 118, 126, 127. In some embodiments, the first, second, and/or third screws 118, 126, 127 and/or perimeter walls 84, 106 generally restrict the direction of engagement and/or mating of the connector 66 with the recesses 80 to be along the orientation of the cord contacts 132 and/or prong apertures 96.

In some embodiments, the engagement and/or mating of the perimeter wall 84 (including first and second shoulders 128, 129) of the recess 80 with the perimeter wall 106 of the connector 66 can help inhibit circumferential movement of the connector 66 relative to the spool member 40, such as, for example, along any direction and/or perimeter of the cylindrical surface 78, including around and along the winding axis 42. The trench 57 and/or the first and second shoulders 128, 129 can help inhibit circumferential movement of the first end portion 62 (including cord segment 60 and/or tubular element 55) relative to the spool member 40, such as, for example, along any direction and/or perimeter of the cylindrical surface 78, including around and along the winding axis 42. In some embodiments, at least one portion of the perimeter walls 84 and 106 can be substantially perpendicular to the circumference and/or perimeter of the cylindrical surface 78 or parallel to the radius of the spool member 40. For example, flat side wall portions 100 of the recess 80 and/or side wall portions 112 of connector 66 can be substantially perpendicular to the circumference of the cylindrical surface 78 or parallel to the radius of the spool member 40. As another example, wall portion 98 of the recess 80 and/or the first wall portion 108 of the connector 66 can be substantially perpendicular to the circumference and/or perimeter of the cylindrical surface 78 or parallel to the radius of the spool member 40.

The combination of the orientation of the first, second, and third screws 118, 126, 127 and structural engagement and/or mating features of the perimeter walls 84, 106 can provide for the perimeter walls 84, 106 to primarily be the load bearing members of the electrical cord reel 10 during, for example, winding and unwinding (spooling and unspooling) of the electrical cord 25 while the first, second, and third screws 118, 126, 127 act to primarily retain the connector 66 in the reel-engagement position. This combination of features helps reduce wear and tear on the first, second, and third screws 118, 126, 127 (and corresponding components as discussed herein) during normal use, such as winding and unwinding of the electrical cord 25. Further, this combination of features can help reduce any load bearing by the engaged prong apertures 96 (and reel contacts) and cord contacts 132.

With reduced wear and tear on the first, second, and third screws 118, 126, 127, the connector 66 can remain tightly secured to the spool member 40 in the recesses 80 over a longer period during the lifetime of the electrical cord reel 10. When the connector 66 remains more tightly secured, abrasion between the perimeter walls 84, 106 can be minimized or eliminated to promote better engagement and/or mating of the perimeter walls 84, 106 over a longer period during the lifetime of the electrical cord reel 10 such that, for example, the perimeter walls 84, 106 remain the load bearing components as discussed herein (e.g., spooling and unspooling of the electrical cord 25). Similarly, when the connector 66 remains more tightly secured, load bearing by the reel contacts of the prong apertures 96 and the cord contacts 132 is reduced to help maintain the integrity of the connections between the reel contacts of the prong apertures 96 and the cord contacts 132, which can promote better electrical contact and conductivity over a longer period during the lifetime of the electrical cord reel 10.

Referring to FIGS. 7 and 8, the connector 66 can include a plurality of electrically conductive "cord contacts" 132 which can be equal in number to the aforementioned reel contacts and/or prong apertures 96 of the spool member 40. In some embodiments, the number of reel contacts can be equal to the number of wires of the cord segment 60. When the connector 66 is in its reel-engagement position, each of the cord contacts 132 can connect electrically with a different one of the reel contacts, such that the reel 10 is configured to convey electrical power from an external power source to the reel contacts and to the cord contacts 132 and the wires of the cord segment 60 of the electrical cord 25. In the illustrated embodiment, the cord contacts 132 are disposed within the first wall portion 108 of the connector 66 and comprise prongs adapted to be inserted into the apertures 96 of the spool member 40. It will be appreciated that other types of cord contacts 132 can be provided, and that the contacts 132 can be positioned at different locations of the connector 66, giving consideration to the goal of forming electrical connections between the cord contacts 132 and appropriately configured and positioned reel contacts of the spool member 40.

Figure 10:
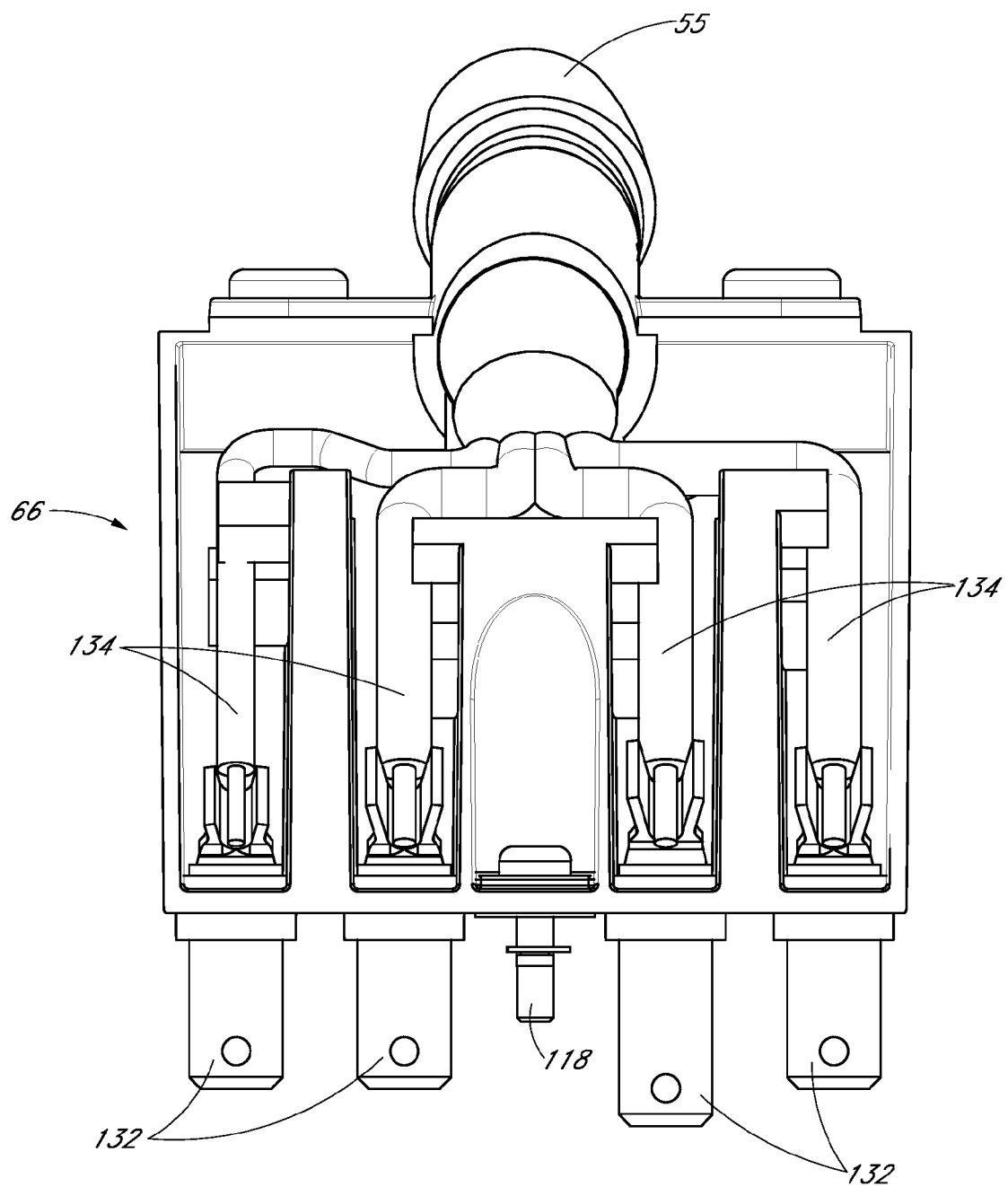
FIG. 10 is a side view of a reel-engaging end of an electrical cord showing internal components.

FIG. 10 is a top view of an embodiment of the connector 66, with an upper cover, such as, for example, the upper portion 104, removed to show internal components. Each prong 132 can be connected to a corresponding electrical extension 134 that in turn connects to one of the wires of the cord segment 60 of the electrical cord 25. Any suitable connection can be used to connect prongs 132 with the electrical extensions 134, such as, for example, keyed connectors, locking mechanisms, terminal blocks, posts, crimp-on connectors, blade connectors, ring and spade terminals, plug and socket connectors, and/or the like.

Figure 11:
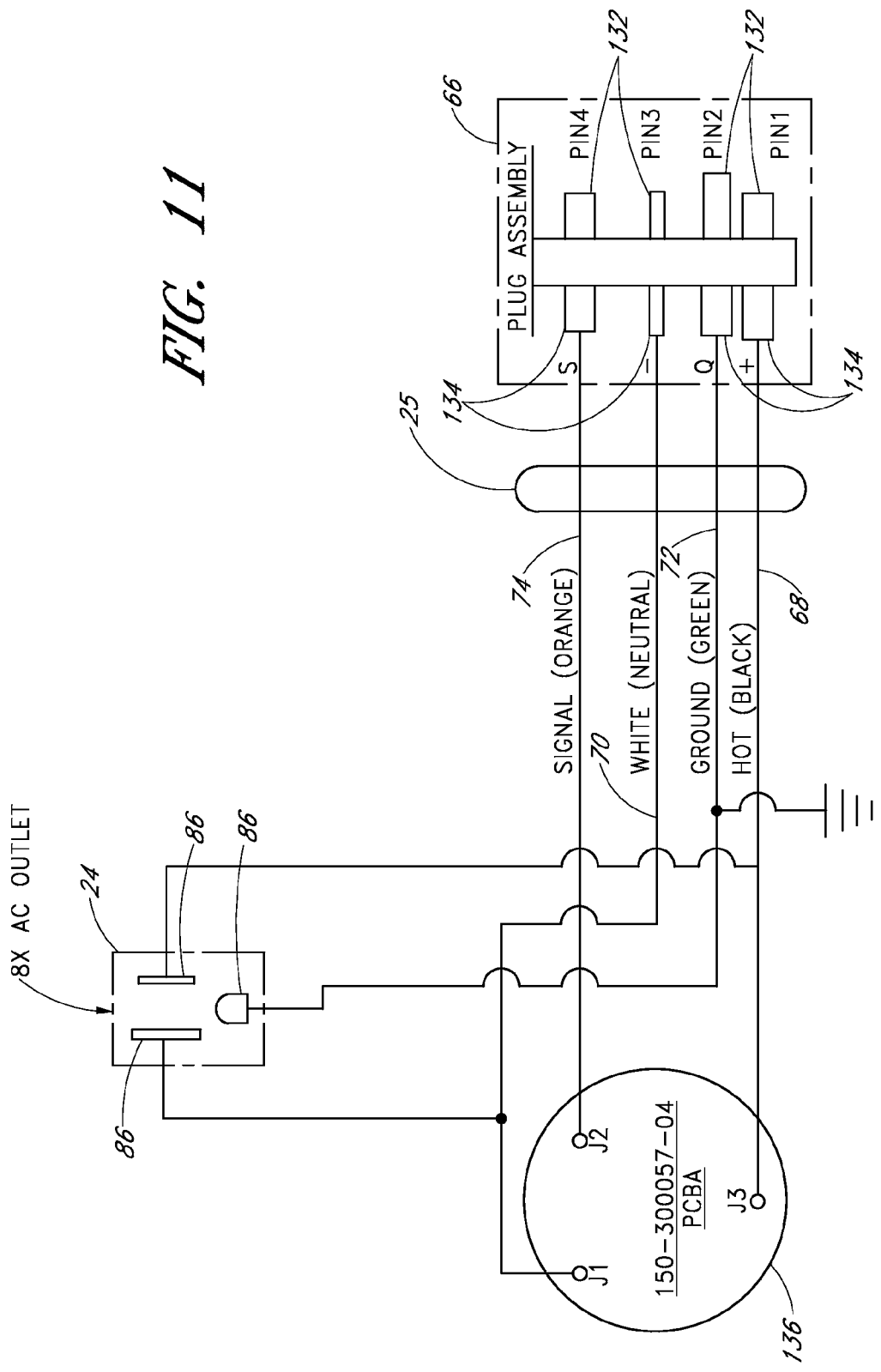
FIG. 11 is a circuit diagram of an embodiment of an electrical cord.

FIG. 11 is a circuit diagram of an embodiment of the electrical cord 25. In the illustrated embodiment, the cord segment 60 (FIG. 5) includes a hot wire 68, a neutral wire 70, a ground wire 72, and a signal wire 74. The electrical plug receptacle 24 includes apertures 86 for receiving the prongs of a device plug, as described above. The connector 66 includes cord contacts 132 and electrical extensions 134 as described above. The reel 10 can include a printed circuit board 136 that controls the electrical/electronic performance of the reel, including its motor and other features. Examples of possible usage of the circuit board 136 are provided in U.S. Pat. No. 7,350,736, and U.S. patent application Ser. No. 13/216,673 filed Aug. 24, 2011 and 61/515,727 filed Aug. 5, 2011. The neutral wire 70, signal wire 74, and hot wire 68 (and their corresponding cord contacts 132 and extensions 134) can be electrically connected, respectively, to circuit board terminals J1, J2, and J3. The ground wire 72 and its corresponding cord contact 132 and extension 134 can be electrically grounded as shown.

Figure 12:
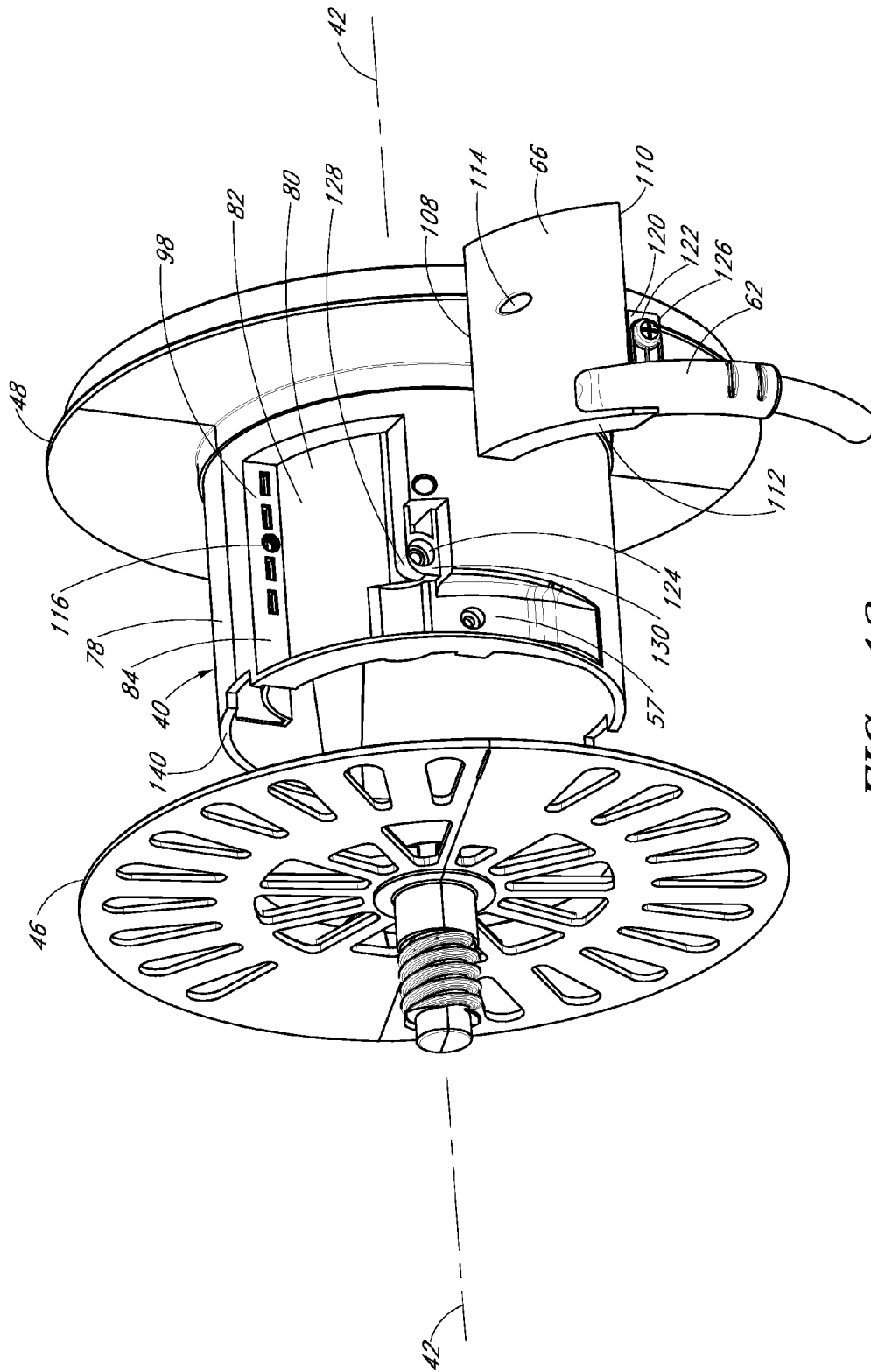
FIG. 12 is a perspective view of an embodiment of a spool member and an electrical cord connector.

FIG. 12 illustrates an alternative embodiment of a spool member 40 and electrical cord connector 66. This alternative embodiment can have similar or identical features as discussed herein in reference to FIGS. 1-11. Accordingly, details of the embodiment of FIGS. 1-11 are not repeated here, except to discuss some of the varying features of the embodiment of FIG. 12. For ease of description and understanding, some of the reference numerals used in FIG. 12 are the same as those of FIGS. 1-11.

Referring to FIG. 12, the illustrated trench 57 is positioned at or near an end 140 of the cylindrical surface 78 of the spool member 40, such as near the circular plate 46. For illustration, the plate 46 is shown slightly distanced from the cylindrical drum portion of the illustrated spool member 40. In some embodiments, the distance between trench 57 and the plate 46 can be less than three inches, less than two inches, or less than one inch, including bordering ranges and the foregoing values. Correspondingly, the first end portion 62 of the cord segment 60 can be positioned at or near a corresponding side wall of the connector 66. In some embodiments, the distance between the first end portion 62 and the nearest side wall portion 112 of the connector 66 can be less than three inches, less than two inches, or less than one inch, including bordering ranges and the foregoing values.

An off-center or side positioning of the trench 57 and first end portion 62 of the cord segment 60 can facilitate smoother spooling of the electrical cord across the length of the spool member 40, by initiating the spooling of the cord 25 at one end of the spool member rather than at a center location as in the embodiment of FIGS. 1-11. The cord segment 60 can alternate or zigzag from side to side as the cord 25 is being wound to promote more uniform winding of the cord 25 on the spool member 40 and/or minimize kinks or bends in the cord segment 60. For example, with each successive rotation of the spool member 40, a new loop of the cord segment 60 around the spool member 25 can be formed generally next to (along the winding axis 42) a previously formed loop of the cord segment 60 on the spool member 40. While the illustrated trench 57 and first end portion 62 are located at or near the plate 46 of the spool member 40, it will be appreciated that in some embodiments, they can be located at or near plate 48. In some embodiments, a similar or same alternating or zig-zagging spooling pattern of the cord 24 can be achieved with the trench 57 and the first end portion 62 being located at or near the center of the spool member 40 as discussed herein, and in particular, in reference to FIGS. 1-11.

In the embodiment illustrated in FIG. 12, two screws can be used for attaching the connector 66 to the spool member 40. The illustrated connector 66 includes a first connector screw hole 114 extending through the first wall portion 108 of the connector 66 as discussed herein. A first reel screw hole 116 is provided within the perimeter wall 84 of the recess 80, such as, for example, within the wall portion 98 as discussed herein. The first reel screw hole 116 is configured to align with the first connector screw hole 114 when the connector 66 is in the reel-engagement position. A first screw, which can correspond to the first screw 118 as discussed herein, can be configured to extend through the first connector screw hole 114 and the first reel screw hole 116.

In the illustrated embodiment, a first flange 120 extends from the second wall portion 110 of the connector 66. A second connector screw hole 122 can extend through the first flange 120. A second reel screw hole 124 can be provided within the spool member 40. The second reel screw hole 124 can be configured to align with the second connector screw hole 122 when the connector 66 is in the reel-engagement position. A second screw 126 can be configured to extend through the second connector screw hole 122 and the second reel screw hole 124.

In the illustrated embodiment, the recess 80 includes a first shoulder 128 on a side of the trench 57, such that the trench 57 is positioned between the plate 46 and the first shoulder 128. The first shoulder 128 can have a first radially outer surface 130. A distance between the center or winding axis 42 and the outer cylindrical surface 78 of the spool member 40 can be longer than a distance between the axis 42 and the first radially outer surface 130 of the first shoulder 128. A distance between the center or winding axis 42 and the floor 82 of the recess 80 can be shorter than the distance between the axis 42 and the first radially outer surface 130 of the first shoulder 128. In the illustrated embodiment, the second reel screw hole 124 is formed within the first radially outer surface 130 of the first shoulder 128. In the illustrated embodiments shown in FIG. 12, the same features, functions, and/or benefits of the reel-engagement as discussed herein can be achieved without a second shoulder, a second radially outer surface, a second shoulder, and/or a third reel screw hole. For example, the same orientation of the first and second screws 118, 126, the prong apertures 96 (and reel contacts), and/or cord contacts 132 can provide installation ease while promoting load bearing by the perimeter walls 84, 106 during operation of the electrical cord reel 10 as discussed herein.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An electrical cord reel comprising:
    a spool member having an outer cylindrical surface, the spool member being rotatable about a center axis of the spool member, the cylindrical surface having a recess defined by a floor, the spool member having a trench formed within the cylindrical surface, the trench having first and second ends, the trench at the first end extending into the recess, the trench extending substantially circumferentially from the recess;
    a plurality of electrically conductive reel contacts accessible via the recess; and
    an electrical cord configured to be wound on the outer cylindrical surface of the spool member, the electrical cord comprising:
        a cord segment having a plurality of wires, and
        a connector connected to an end portion of the cord segment, the connector having a reel-engagement position in which the connector resides within the recess of the spool member, the connector being securable to the spool member by at least one screw to facilitate selective attachment and removal of the connector with respect to the spool member, the connector including a plurality of electrically conductive cord contacts equal in number to the reel contacts,
    wherein, when the connector is in the reel-engagement position:
        an inner major surface of the connector mates with the floor of the recess,
        an outer major surface of the connector replaces at least a majority of the spool member's cylindrical surface that is not included due to the presence of the recess,
        the end portion of the cord segment resides within the trench;
        each of the cord contacts connects electrically with a different one of the reel contacts, and
        the reel is configured to convey electrical power from an external power source to the reel contacts and to the cord contacts and the wires of the cord segment.

2. The cord reel of claim 1, wherein, when the connector is in the reel-engagement position, the outer major surface of the connector is substantially flush with the spool member's cylindrical surface.

3. The cord reel of claim 1, wherein the floor of the recess is curved to generally match a curvature of the outer cylindrical surface of the spool member.

4. The cord reel of claim 1, wherein the trench includes a floor whose distance from the center axis tapers from a first distance at the first end of the trench to a second distance at the second end of the trench, the second distance being longer than the first distance and being equal to a radius of the cylindrical surface of the spool member.

5. The cord reel of claim 1, wherein the number of reel contacts is equal to the number of cord contacts and is also equal to the number of wires of the plurality of wires of the cord segment.

6. The cord reel of claim 1, wherein the plurality of wires comprises a ground wire, a hot wire, and a neutral wire.

7. The cord reel of claim 6, wherein the plurality of wires further comprises at least one signal wire.

8. The cord reel of claim 1, wherein the reel contacts are disposed within a perimeter wall of the recess, the perimeter wall circumscribing the floor of the recess.

9. The cord reel of claim 8, wherein the reel contacts are disposed within prong apertures formed in the perimeter wall.

10. The cord reel of claim 8, wherein the connector includes a perimeter wall extending from the inner major surface to the outer major surface, the perimeter wall of the connector configured to closely mate with the perimeter wall of the recess when the connector is in the reel-engagement position.

11. The cord reel of claim 10, wherein the perimeter wall of the connector comprises first and second substantially flat wall portions on opposing ends of the connector, the cord contacts being disposed within the first wall portion, the end portion of the cord segment being connected to the second wall portion.

12. The cord reel of claim 11, further comprising:
a first connector screw hole extending through the first wall portion of the connector;
a first reel screw hole within the perimeter wall of the recess, the first reel screw hole configured to align with the first connector screw hole when the connector is in the reel-engagement position;
a first flange extending from the second wall portion of the connector;
a second connector screw hole extending through the first flange; and
a second reel screw hole within the spool member, the second reel screw hole being configured to align with the second connector screw hole when the connector is in the reel-engagement position.

13. The cord reel of claim 12, wherein the recess includes a first shoulder on a side of the trench, the first shoulder having a radially outer surface radially positioned between the floor of the recess and the cylindrical surface of the spool, the second reel screw hole being formed within the radially outer surface of the first shoulder such that, when the at least one screw is in the second reel screw hole, the at least one screw does not radially protrude beyond the cylindrical surface of the spool.

14. The cord reel of claim 12, wherein the at least one screw comprises:
a first screw configured to extend through the first connector screw hole and the first reel screw hole; and
a second screw configured to extend through the second connector screw hole and the second reel screw hole.

15. The cord reel of claim 12, further comprising:
a second flange extending from the second wall portion of the connector on an opposing side of the end portion of the cord segment with the first flange;
a third connector screw hole extending through the second flange; and
a third reel screw hole within the spool member, the third reel screw hole configured to align with the third connector screw hole when the connector is in the reel-engagement position.

16. The cord reel of claim 15, wherein the recess includes a pair of shoulders on opposing sides of the trench, the shoulders having radially outer surfaces radially positioned between the floor of the recess and the cylindrical surface of the spool, the second reel screw hole being formed within the radially outer surface of a first shoulder of the pair of shoulders, and the third reel screw hole being formed within the radially outer surface of a second shoulder of the pair of shoulders, such that, when the at least one screw is in the second reel screw hole or the third reel screw hole, the at least one screw does not radially protrude beyond the cylindrical surface of the spool.

17. The cord reel of claim 16, wherein the at least one screw comprises:
a first screw configured to extend through the first connector screw hole and the first reel screw hole;
a second screw configured to extend through the second connector screw hole and the second reel screw hole; and
a third screw configured to extend through the third connector screw hole and the third reel screw hole.

18. An electrical cord reel comprising:
a spool member rotatable about a winding axis, the spool member comprising a spool surface having a depression;
an electrical cord configured for spooling on the spool surface of the spool member, the electrical cord comprising:
a cord segment having a wire, and
an adapter on an end of the electrical cord and connected to the cord segment, the adapter configured to be removably disposed in the depression,
wherein an electrical connection is formed between the electrical cord reel and the electrical cord when the adapter is disposed in the depression; and
wherein rotation of the spool member causes a translational movement of the electrical cord at least partially through movement of the adapter along with the spool surface when the adapter is in the depression.

19. The cord reel of claim 18, wherein the adapter comprises a top surface at least partially flush with the spool surface when the adapter is in the depression such that kinks in the electrical cord are minimized when the electrical cord is wound onto the spool member.

20. The cord reel of claim 18, wherein the adapter comprises a perimeter wall between a top surface and a bottom surface of the adapter, and the depression comprises a perimeter wall bounding a lower surface of the depression, and wherein the perimeter wall of the depression engages the perimeter wall of the adapter to at least partially cause movement of the adapter when the spool member rotates such that the perimeter wall of the depression and the perimeter wall of the adapter at least partially bear loads resulting from movement of the adapter when the adapter is in the depression and the spool member rotates.

21. The cord reel of claim 20, wherein at least a portion of the perimeter wall of the adapter is substantially perpendicular to the spool surface when the adapter is in the depression, and wherein the adapter further comprises a cord prong extending from the perpendicular portion of the perimeter wall of the adapter along a direction substantially perpendicular to the perpendicular portion of the perimeter wall of the adapter such that the loads resulting from movement of the adapter when in the depression are minimized on the cord prongs by the loads acting substantially parallel to the extension direction of the cord prongs.

22. The cord reel of claim 18, wherein the adapter comprises a first adapter connector hole, and the depression comprises a first depression connector hole, and wherein the first adapter connector hole and the first depression connector hole are configured to accept a first connector to secure the adapter in the depression.

23. The cord reel of claim 22, wherein the first adapter connector hole and the first depression connector hole are configured to orient the first connector substantially perpendicular to a radius of the spool member from the winding axis, and wherein the adapter comprises a cord prong configured to form the electrical connection between the electrical cord reel and the electrical cord when the adapter is in the depression, the cord prong projecting from the adapter in a direction substantially parallel with the first connector when the first connector is in the first adapter connector hole and the first depression connector hole such that loads resulting from movement of the adapter when the adapter is in the depression and the spool member rotates are minimized on the first connector and the cord prong.

24. The cord reel of claim 22, wherein the adapter comprises a second adapter connector hole, and the depression comprises a second depression connector hole, and wherein the second adapter connector hole and the second depression connector hole are configured to accept a second connector to secure the adapter in the depression, and wherein second connector is oriented substantially parallel to the first connector when the second connector is in the second adapter connector hole and the second depression connector hole and when the first connector is in the first adapter connector hole and the first depression connector hole, such that the second connector acts in parallel with the first connector to secure the adapter in the depression and inhibits loads on one or more cord prongs of the adapter as the spool member is rotated.

* * * * *